(12) United States Patent
Miranda Gavillan et al.

(10) Patent No.: US 10,276,214 B2
(45) Date of Patent: Apr. 30, 2019

(54) DATA STORAGE LIBRARY WITH ACCLIMATION CHAMBER

(71) Applicant: International Business Machines Corporation, Armonk, NY (US)

(72) Inventors: Jose G. Miranda Gavillan, Tucson, AZ (US); Brian G. Goodman, Tucson, AZ (US); Kenny Nian Gan Qiu, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/801,709

(22) Filed: Nov. 2, 2017

(65) Prior Publication Data

US 2018/0268874 A1  Sep. 20, 2018

Related U.S. Application Data

(63) Continuation of application No. 15/460,345, filed on Mar. 16, 2017, now Pat. No. 9,916,871.

(51) Int. Cl.
*G11B 33/14* (2006.01)
*G11B 5/008* (2006.01)
(Continued)

(52) U.S. Cl.
CPC ........ *G11B 33/144* (2013.01); *G11B 5/00813* (2013.01); *G11B 15/68* (2013.01); *G11B 17/22* (2013.01); *G11B 33/1406* (2013.01)

(58) Field of Classification Search
CPC ... G11B 33/144; G11B 5/00813; G11B 17/22; G11B 15/68; G11B 33/1406
See application file for complete search history.

(56) References Cited

U.S. PATENT DOCUMENTS 4,831,476 A  5/1989 Branc et al.
4,838,911 A  6/1989 Robertson et al.
(Continued)

FOREIGN PATENT DOCUMENTS

CN  102192631 A  9/2011
CN  102407663 A  4/2012
(Continued)

OTHER PUBLICATIONS

McCormick-Goodhart M. et al, "The Design and Operation of a Passive Humidity-Controlled Cold Storage Vault Using Conventional Freezer Technology and Moisture-Sealed Cabinets", IS&T's 2004 Archiving Conference, Apr. 20-23, 2005, San Antonio, Texas.
(Continued)

*Primary Examiner* — Brian E Miller
(74) *Attorney, Agent, or Firm* — Fox Rothschild LLP

(57) ABSTRACT

A data storage library includes at least a first library portion and at least a second library portion, with the second library portion including an environmental conditioning unit configured to control environmental conditions within the second library portion. The data storage library also includes at least one acclimation chamber formed within the first library portion, which permits transition of environmental condition(s) within the at least one acclimation chamber toward at least one of the corresponding environmental condition(s) external and internal to the second library portion. At least one deployable environmental barrier is configured to extend at least partially between the first library portion and the second library portion to insulate the at least one environmental condition within the at least one acclimation chamber from the at least one environmental condition within the second library portion.

9 Claims, 10 Drawing Sheets

(51) Int. Cl.
  *G11B 15/68* (2006.01)
  *G11B 17/22* (2006.01)

(56) References Cited

U.S. PATENT DOCUMENTS

| | | |
|---|---|---|
| 5,278,708 A | 1/1994 | Apple et al. |
| 5,449,229 A | 9/1995 | Aschenbrenner et al. |
| 5,940,354 A | 8/1999 | Inoue |
| 6,347,020 B1 | 2/2002 | Carpenter et al. |
| 6,366,982 B1 | 4/2002 | Suzuki et al. |
| 6,409,450 B1 | 6/2002 | Ostwald et al. |
| 6,457,928 B1 | 10/2002 | Ryan |
| 6,467,285 B2 | 10/2002 | Felder et al. |
| 6,478,524 B1 | 11/2002 | Malin |
| 6,494,663 B2 | 12/2002 | Ostwald et al. |
| 6,537,013 B2 | 3/2003 | Emberty et al. |
| 6,563,771 B1 | 5/2003 | Debiez |
| 6,661,596 B2 | 12/2003 | Chliwnyj et al. |
| 6,676,026 B1 | 1/2004 | McKinley et al. |
| 6,676,505 B2 | 1/2004 | Behl |
| 6,854,275 B2 | 2/2005 | Evans |
| 6,896,612 B1 | 5/2005 | Novotny |
| 6,924,981 B2 | 8/2005 | Chu et al. |
| 6,940,716 B1 | 9/2005 | Korinsky et al. |
| 7,039,924 B2 | 5/2006 | Goodman et al. |
| 7,106,538 B2 | 9/2006 | Minemura et al. |
| 7,277,247 B2 | 10/2007 | Hoshino |
| 7,434,412 B1 | 10/2008 | Miyahira |
| 7,474,497 B2 | 1/2009 | Jesionowski et al. |
| 7,635,246 B2 | 12/2009 | Neeper et al. |
| 7,656,602 B2 | 2/2010 | Iben et al. |
| 7,656,660 B2 | 2/2010 | Hoeft et al. |
| 7,746,634 B2 | 6/2010 | Hom et al. |
| 7,751,188 B1 | 7/2010 | French et al. |
| 7,961,419 B2 | 6/2011 | Suzuki et al. |
| 8,051,671 B2 | 11/2011 | Vinson et al. |
| 8,141,621 B2 | 3/2012 | Campbell et al. |
| 8,151,046 B2 | 4/2012 | Suzuki et al. |
| 8,206,976 B2 | 6/2012 | Kobayashi et al. |
| 8,210,914 B2 | 7/2012 | McMahan et al. |
| 8,514,513 B2 | 8/2013 | Hori |
| 8,544,289 B2 | 10/2013 | Johnson et al. |
| 8,675,303 B2 | 3/2014 | Compton et al. |
| 8,694,152 B2 | 4/2014 | Cyrulik et al. |
| 8,789,384 B2 | 7/2014 | Eckberg et al. |
| 8,849,784 B2 | 9/2014 | Alber et al. |
| 8,857,208 B2 | 10/2014 | Malin |
| 8,939,524 B2 | 1/2015 | Gasser |
| 8,974,274 B2 | 3/2015 | Carlson |
| 9,025,275 B1 | 5/2015 | Manes et al. |
| 9,069,534 B2 | 6/2015 | Rogers |
| 9,110,641 B2 | 8/2015 | Wu |
| 9,155,230 B2 | 10/2015 | Eriksen |
| 9,190,112 B1 | 11/2015 | Bayang et al. |
| 9,240,209 B1 | 1/2016 | Crawford et al. |
| 9,255,936 B2 | 2/2016 | Hunt et al. |
| 9,291,408 B2 | 3/2016 | Iyengar et al. |
| 9,321,136 B2 | 4/2016 | Eckberg et al. |
| 9,361,921 B2 | 6/2016 | Herget |
| 9,368,148 B2 | 6/2016 | Starr et al. |
| 9,433,122 B2 | 8/2016 | Ohba et al. |
| 9,642,286 B1 | 5/2017 | Gutierrez et al. |
| 9,888,615 B1 | 2/2018 | Frink et al. |
| 9,916,869 B1 | 3/2018 | Miranda Gavillan et al. |
| 10,004,165 B1 | 6/2018 | Bailey |
| 10,026,455 B1 | 7/2018 | Miranda Gavillan et al. |
| 10,045,457 B1 | 8/2018 | Miranda Gavillan et al. |
| 2002/0023444 A1 | 2/2002 | Felder et al. |
| 2002/0098064 A1 | 7/2002 | Ostwald et al. |
| 2003/0039056 A1 | 2/2003 | Satoh |
| 2003/0197619 A1 | 10/2003 | Lawrence et al. |
| 2004/0025515 A1 | 2/2004 | Evans |
| 2004/0080244 A1 | 4/2004 | Lowther et al. |
| 2004/0145468 A1 | 7/2004 | La et al. |
| 2004/0153386 A1 | 8/2004 | Eckerdt |
| 2004/0165358 A1 | 8/2004 | Regimbal et al. |
| 2004/0264042 A1 | 12/2004 | Pollard et al. |
| 2005/0170770 A1 | 8/2005 | Johnson et al. |
| 2005/0185323 A1 | 8/2005 | Brace et al. |
| 2005/0270727 A1 | 12/2005 | Shih |
| 2006/0177922 A1 | 8/2006 | Shamah et al. |
| 2006/0250578 A1 | 11/2006 | Pohl et al. |
| 2006/0259195 A1 | 11/2006 | Eliuk et al. |
| 2007/0180278 A1 | 8/2007 | Botchek |
| 2007/0250410 A1 | 10/2007 | Brignone et al. |
| 2008/0094797 A1 | 4/2008 | Coglitore et al. |
| 2008/0106368 A1 | 5/2008 | Vitier |
| 2008/0151491 A1 | 6/2008 | Baldwin et al. |
| 2008/0231152 A1 | 9/2008 | Malin |
| 2009/0046427 A1 | 2/2009 | Noteboom et al. |
| 2009/0061758 A1 | 3/2009 | Yeung et al. |
| 2009/0266511 A1 | 10/2009 | Yang |
| 2010/0078492 A1 | 4/2010 | Cislo |
| 2010/0170277 A1 | 7/2010 | Schmitt et al. |
| 2010/0188810 A1 | 7/2010 | Andersen et al. |
| 2010/0254241 A1 | 10/2010 | Aoki |
| 2011/0108207 A1 | 5/2011 | Mainers et al. |
| 2011/0231007 A1 | 9/2011 | Biehle et al. |
| 2012/0046792 A1 | 2/2012 | Secor |
| 2012/0155027 A1 | 6/2012 | Broome et al. |
| 2012/0305042 A1 | 12/2012 | Lorbiecki |
| 2013/0031928 A1 | 2/2013 | Kim |
| 2013/0088833 A1 | 4/2013 | Cox et al. |
| 2013/0128455 A1 | 5/2013 | Koblenz et al. |
| 2013/0244563 A1 | 9/2013 | Noteboom et al. |
| 2014/0059946 A1 | 3/2014 | Gardner et al. |
| 2014/0206271 A1 | 7/2014 | Ignacio |
| 2014/0238639 A1 | 8/2014 | Ambriz et al. |
| 2014/0277765 A1 | 9/2014 | Karimi et al. |
| 2014/0290162 A1 | 10/2014 | Tanimoto |
| 2014/0293471 A1 | 10/2014 | Sakuma |
| 2015/0036293 A1 | 2/2015 | Martini |
| 2015/0088319 A1 | 3/2015 | Dasari et al. |
| 2015/0167996 A1 | 6/2015 | Fadell et al. |
| 2015/0179210 A1 | 6/2015 | Ostwald et al. |
| 2015/0203297 A1 | 7/2015 | Manning et al. |
| 2015/0269641 A1 | 9/2015 | Roy |
| 2015/0294525 A1 | 10/2015 | Broom et al. |
| 2016/0094898 A1 | 3/2016 | Primm et al. |
| 2016/0107312 A1 | 4/2016 | Morrill et al. |
| 2016/0109389 A1 | 4/2016 | Suzuki et al. |
| 2016/0112245 A1 | 4/2016 | Mankovskii |
| 2016/0117126 A1 | 4/2016 | De Spiegeleer et al. |
| 2016/0240061 A1 | 8/2016 | Li et al. |
| 2016/0302332 A1 | 10/2016 | Anderson et al. |
| 2017/0010015 A1 | 1/2017 | Jan |
| 2017/0064876 A1 | 3/2017 | Leckelt et al. |
| 2017/0154483 A1 | 6/2017 | Cordiner et al. |
| 2017/0275012 A1 | 9/2017 | Tretow et al. |
| 2017/0323666 A1 | 11/2017 | Jesionowski et al. |
| 2017/0347496 A1 | 11/2017 | Smith |
| 2018/0077819 A1 | 3/2018 | Roy |
| 2018/0155975 A1 | 6/2018 | Kempfle |
| 2018/0172304 A1 | 6/2018 | Wolfson |

FOREIGN PATENT DOCUMENTS

| | | |
|---|---|---|
| CN | 102881313 A | 1/2013 |
| CN | 204361533 U | 5/2015 |
| JP | 11-287499 | 10/1999 |
| JP | 2001307474 A | 11/2001 |
| JP | 2009087518 A | 4/2009 |
| JP | 2011191207 A | 9/2011 |
| WO | 2007099542 A2 | 9/2007 |
| WO | 2008014578 A1 | 2/2008 |
| WO | 2009134610 A2 | 11/2009 |
| WO | 2010067443 A1 | 6/2010 |

OTHER PUBLICATIONS

Hanaoka Y. et al., "Technologies for Realizing New ETERNUS LT270 High-End Tape Library System", FUJITSU Sci. Tech. J., 42.1, pp. 24-31, Jan. 2006.

(56) References Cited

OTHER PUBLICATIONS

Frachtenberg E. et al., "Thermal Design in the Open Compute Datacenter", Thermal and Thermomechanical Phenomena in Electronic Systems (ITherm), 13th IEEE I22012.
Oga, S. et al., "Indirect External Air Cooling Type Energy-Saving Hybrid Air Conditioner for Data Centers, "F-COOL NEO"", Fuji Electric Review, vol. 60, No. 1, Mar. 30, 2014, pp. 59-64.
Lee, S. et al., "Thermoelectric-based Sustainable Self-Cooling for Fine-Grained Processor Hot Spots", 15th IEEE ITHERM Conference, May 31-Jun. 3, 2016, pp. 847-856.
Disclosed Anonymously, ip.com, "Method for a Direct Air Free Cooling with a real time hygrometry regulation for Data Center", IPCOM000200312D, Oct. 5, 2010, pp. 1-3.
Rasmussen N., "Cooling Options for Rack Equipment with Side-to-Side Airflow", www.apc.com, 2004.
Ouchi M. et al., "Thermal Management Systems for Data Centers with Liquid Cooling Technique of CUP" ITherm IEEE 13th Intersociety Conference, May 30-Jun. 1, 2012, pp. 790-798.
Authors: IBM, "Energy Efficient Cooling System for Data Center", IPCOM000182040D, Apr. 23, 2009, pp 1-4.
Ernest S. Gale et al., U.S. Appl. No. 15/460,389, filed Mar. 16, 2017.
Ernest S. Gale et al., U.S. Appl. No. 15/460,397, filed Mar. 16, 2017.
Ernest S. Gale et al., U.S. Appl. No. 15/460,403, filed Mar. 16, 2017.
Ernest S. Gale et al., U.S. Appl. No. 15/460,420, filed Mar. 16, 2017.
Jose G. Miranda Gavillan et al., U.S. Appl. No. 15/460,345, filed Mar. 16, 2017.
Jose G. Miranda Gavillan et al., U.S. Appl. No. 15/460,357, filed Mar. 16, 2017.
Jose G. Miranda Gavillan et al., U.S. Appl. No. 15/460,379, filed Mar. 16, 2017.
Jose G. Miranda Gavillan et al., U.S. Appl. No. 15/460,402, filed Mar. 16, 2017.
Jose G. Miranda Gavillan et al., U.S. Appl. No. 15/460,423, filed Mar. 16, 2017.
Jose G. Miranda Gavillan et al., U.S. Appl. No. 15/460,441, filed Mar. 16, 2017.
Jose G. Miranda Gavillan et al., U.S. Appl. No. 15/460,456, filed Mar. 16, 2017.
Jose G. Miranda Gavillan et al., U.S. Appl. No. 15/460,472, filed Mar. 16, 2017.
Jose G. Miranda Gavillan et al., U.S. Appl. No. 15/460,479, filed Mar. 16, 2017.
Jose G. Miranda Gavillan et al., U.S. Appl. No. 15/460,429, filed Mar. 16, 2017.
Jose G. Miranda Gavillan et al., U.S. Appl. No. 15/460,439, filed Mar. 16, 2017.
Ernest S. Gale et al., U.S. Appl. No. 15/460,497, filed Mar. 16, 2017.

DATA STORAGE LIBRARY WITH ACCLIMATION CHAMBER

RELATED APPLICATION AND CLAIM OF PRIORITY

This patent document claims priority to, and is a continuation of, U.S. patent application Ser. No. 15/460,345, filed Mar. 16, 2017. The disclosure of the priority application is fully incorporated by reference.

BACKGROUND

The present disclosure relates to a data storage library for the storage and data transfer of a plurality of tape cartridges, and more specifically, to a data storage library having one or more library frames forming an acclimation chamber of the data storage library.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, COMPACTFLASH™, SMARTMEDIA™, MEMORY STICK™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robotic accessors. Such accessors have grippers for physically retrieving the selected data storage cartridges from the storage slots within the automated data storage library and transporting such cartridges to the data storage drives by moving, for example, in the horizontal (X) and vertical (Y) directions.

In an effort to increase storage capacity, deep slot technology allows for storage cells that contain more than a single data storage cartridge. Such storage libraries allow for higher density, or more cartridges stored per square foot. In "deep slot" libraries, two or more cartridges may be stored in a multi-cartridge deep slot cell, arrayed in series, one behind the other, in tiers ranging from a front-most tier to a rearmost tier.

Efforts to improve the performance of traditional data centers attempt to minimize the cost of processing and storing data. One option that is employed to reduce operational costs of datacenters is to run the equipment in the datacenter at the high end of its environmental operational limits, thereby allowing for cooling of the datacenter to be reduced. In other words, datacenters are running increasingly hot and more humid conditions than traditional datacenters in an attempt to reduce operating costs. Although this strategy may be effective when applied to disk and/or flash data storage environments, magnetic tape is more susceptible to degradation when exposed to these unfavorable conditions. Therefore, this option is not available for magnetic tape libraries.

In an effort to control the environment within magnetic tape libraries so as to provide suitable working conditions for magnetic tape media, data storage drives, etc., air conditioning units may be incorporated into the data storage libraries themselves. While these air conditioning units effectively control the temperature and humidity within the data storage libraries, the environmental conditions of the area surrounding the data storage libraries remain largely unchanged, with conditions often being higher in both temperature and humidity. While this may allow a datacenter to operate at reduced costs, it may also result in a marked temperature differential between the interior and exterior environments of the data storage libraries. Such a temperature differential may prove problematic during service of the data storage library and/or replacement of data storage library components such as data storage cartridges, data storage drives, etc., as condensation may develop on replacement cartridges and other service parts during installation and/or removal from the data storage library. Condensation accumulation on such sensitive componentry may cause component failure and/or data loss.

SUMMARY

In accordance with an aspect of the disclosure, a data storage library for the handling and storage of a plurality of data storage cartridges is disclosed. The data storage library comprises at least a first library portion and at least a second library portion, wherein the second library portion is configured to store and receive media associated with one or more data storage cartridges and comprises an environmental conditioning unit configured to control one or more environmental conditions within the second library portion to be different than one or more environmental conditions external to the data storage library. The data storage library also includes at least one acclimation chamber formed by the first library portion, wherein the at least one acclimation chamber permits gradual transition of at least one environmental condition within the at least one acclimation chamber toward at least one of the environmental conditions of the second library portion and the environmental conditions external to the data storage library.

In accordance with another aspect of the disclosure, a system is disclosed having at least a first library portion and at least a second library portion, wherein the second library portion comprises an environmental conditioning unit configured to control at least one environmental condition within the second library portion. The system also includes at least one environmental barrier selectively disposed between the first library portion and the second library portion to form an acclimation chamber in the first library portion, wherein the at least one environmental barrier is configured to separate the first library portion from at least one environmental condition within the second library portion.

According to another aspect of the disclosure, a method of servicing or replacing a component within a data storage library is disclosed. The method includes providing a data storage library having at least a first library portion and a second library portion, initiating a service mode within the data storage library, and deploying an environmental barrier between the first library portion and the second library portion so as to separate the environmental conditions within the first library portion from the environmental conditions within the second library portion to form at least one acclimation chamber. The method also includes monitoring at least one environmental condition within the first library portion, and within one of the interior and the exterior of the second library portion, adjusting at least one environmental condition within the at least one acclimation chamber based upon at least one of monitored environmental conditions within the second library portion and environmental conditions outside of the second library portion, and determining if the at least one environmental condition within the at least one acclimation chamber is within a determined range of one of the monitored environmental conditions within the second library portion and environmental conditions outside of the second library portion. The method also includes enabling access to the at least one acclimation chamber for at least one of component service, insertion, removal, and replacement when it is determined that the at least one environmental condition within the at least one acclimation chamber is within the determined range.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1A:
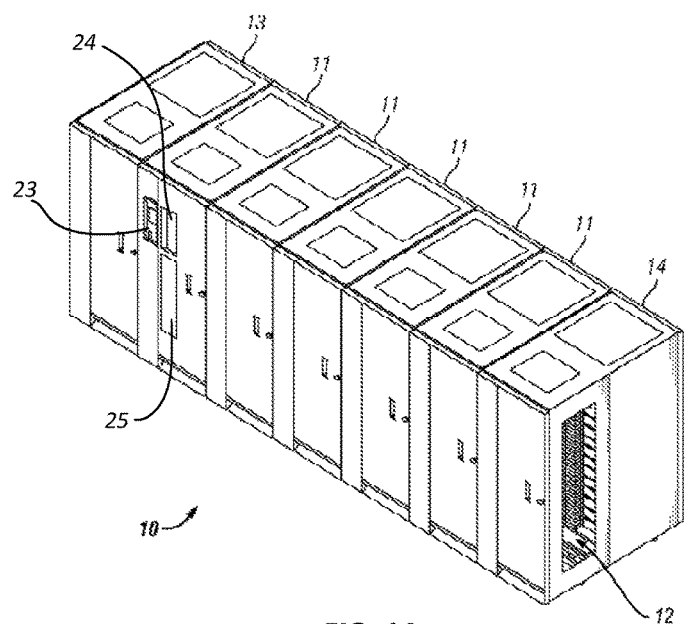
FIG. 1A is a perspective view of one embodiment of an automated data storage library.
Figure 1B:
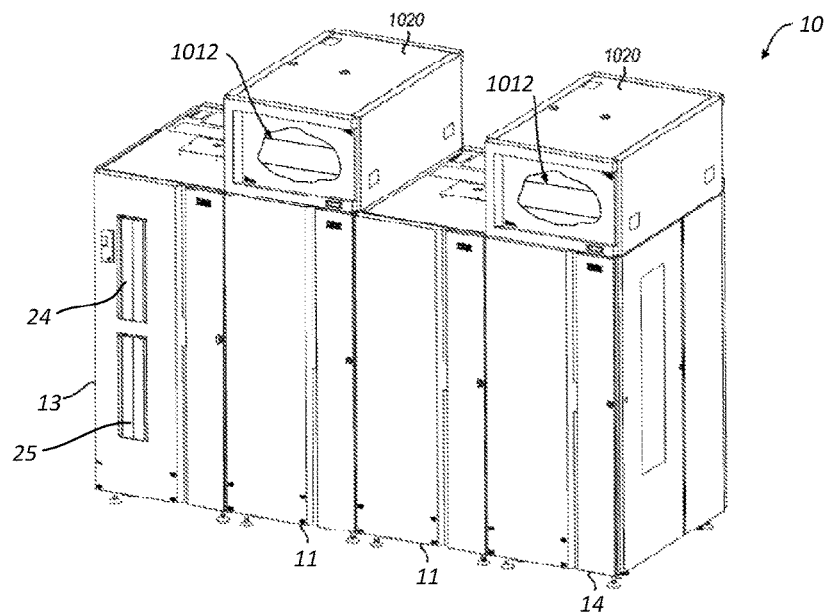
FIG. 1B is a perspective view of another embodiment of an automated data storage library
Figure 2:
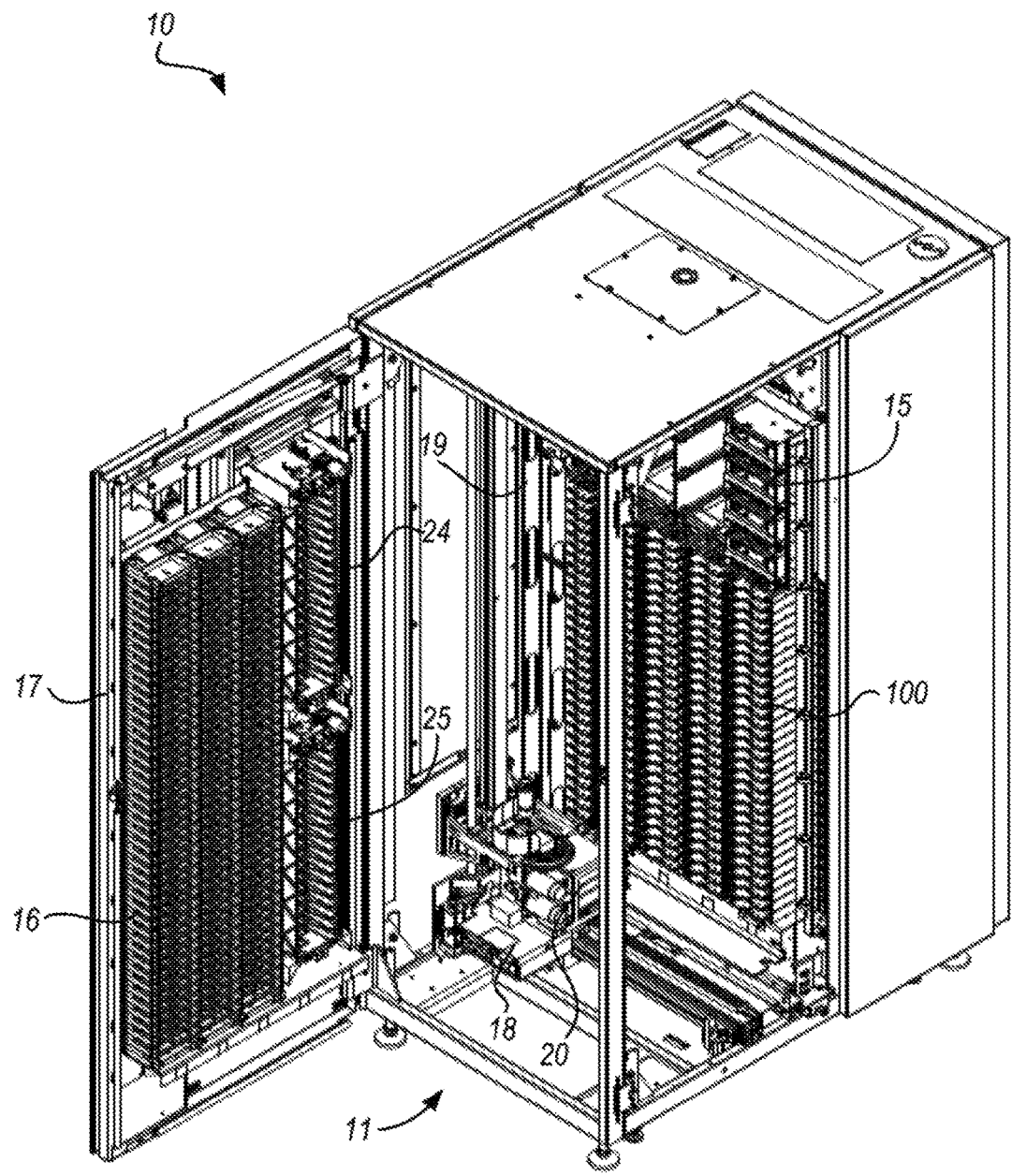
FIG. 2 is a perspective view of a storage frame from the data storage library of FIG. 1B.

FIGS. 1A & 1B and FIG. 2 illustrate an example of a data storage system, e.g., an automated data storage library 10 which stores and retrieves data storage cartridges, containing data storage media (not shown), from multi-cartridge deep slot storage cells 100 and single cartridge storage slots 16. Examples of an automated data storage library which has a similar configuration as that depicted in FIG. 1A and FIG. 2, and may be implemented with some of the various approaches herein may include IBM TS4500 Library or the IBM 3584 UltraScalable Tape Library.

The library 10 in the embodiment of FIG. 1A comprises a left hand service bay 13, one or more storage frames 11, and right hand service bay 14. The library 10 of FIG. 1B comprises a left handed service bay 13, one or more storage frames 11, a right handed service bay 14 and optional environmental conditioning units 1012 which may control the temperature, humidity and/or other environmental conditions in the interior of the library 10. While two environmental conditioning units are shown in FIG. 1B, it will be appreciated that more or less environmental conditioning units 1012 may be associated with the library, and in circumstances the library may have no environmental conditioning units. As will be discussed in further detail below, a frame may comprise an expansion component of the library. Thus, storage frames may be added or removed to expand or reduce the size and/or functionality of the library. According to different approaches, frames may include additional storage slots, deep storage slot cells, drives, import/export stations, accessors, operator panels, controller cards, communication cards, etc. Moreover, an accessor aisle 12 preferably extends between the storage frames and bays of the embodiments in FIGS. 1A & 1B thereby allowing an accessor to move between frames. A moveable and/or deployable panel 21 may be displaced to cover and/or block (as well uncover and/or unblock) aisle 12 from communicating with the exterior of the data storage library. Panel 21 may be moved and/or removed to permit access to the interior of the service bays 13, 14. Panel 21 may be a window to permit visibility into the library 10.

FIG. 2 shows an exemplary embodiment of a storage frame 11, which may act as the base frame of the library 10. The storage frame 11 illustrated in FIG. 2 may have only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front door 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. The arrangement and positioning of the storage slots 16 and the deep slot cells 100 may be different than illustrated in FIG. 2.

With continued reference to FIG. 2, the storage frame 11 of the library 10 also includes at least one data storage drive 15, e.g., for reading and/or writing data with respect to the data storage media in the data storage cartridges. Additionally, a first accessor 18 may be used to transport data storage cartridges containing data storage media between the plurality of storage slots 16, the multi-cartridge deep slot cells 100, and/or the data storage drive(s) 15. According to various approaches, the data storage drives 15 may be optical disk drives, magnetic tape drives, or other types of data storage drives that are used to read and/or write data with respect to the data storage media.

As illustrated, the storage frame 11 may optionally include an operator panel or other user interface, such as a web-based interface, which allows a user to interact with the library 10. Optionally, the library 10 may have an associated software application having a user interface, which also allows a user to interact with the library 10. The software application may be executable on a computing device, a remote server, a cloud or a mobile device.

Figure 3:
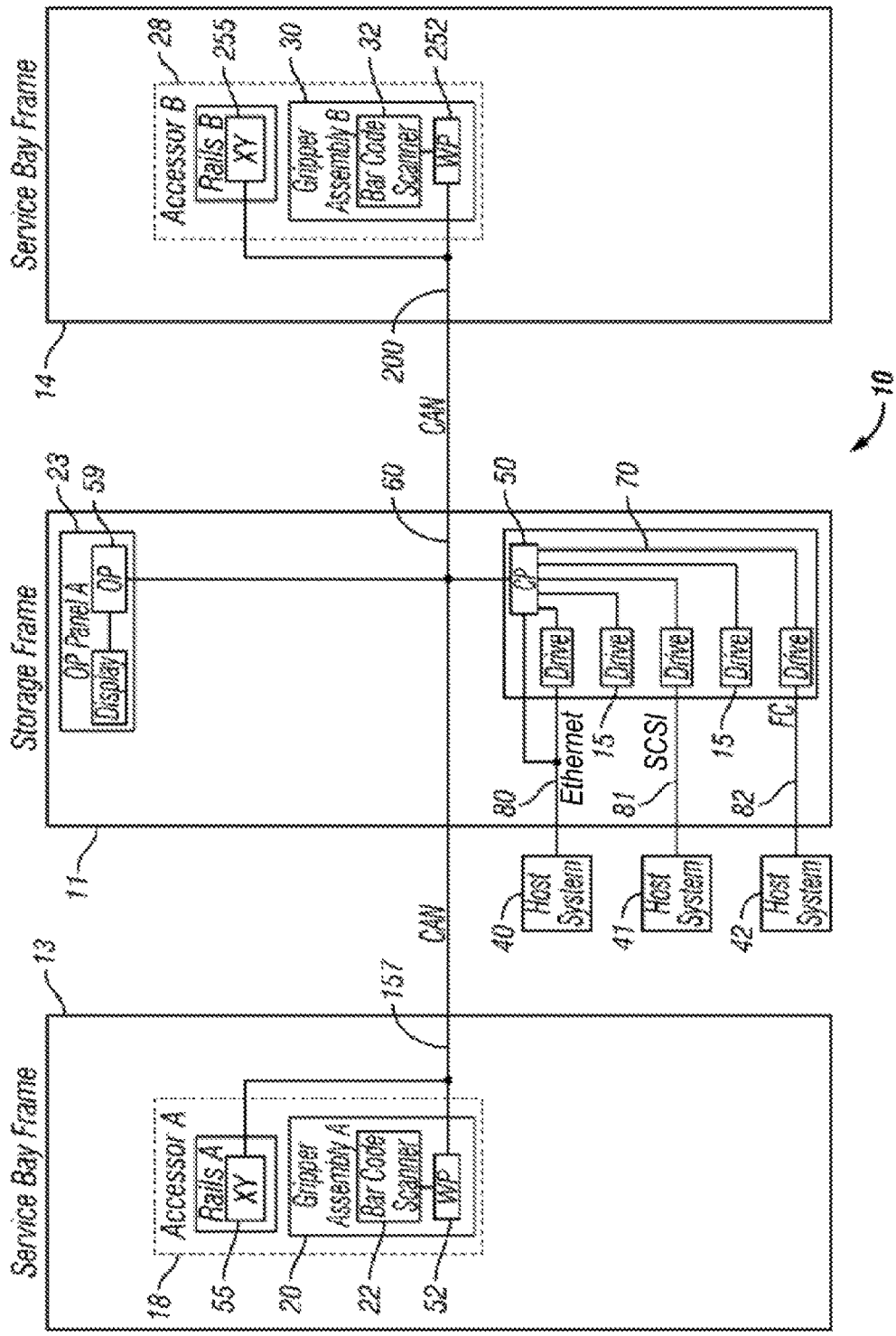
FIG. 3 is a schematic diagram of one embodiment of an automated data storage library.

Referring now to FIG. 3, the automated data storage library 10 as described in reference to FIGS. 1A & 1B and FIG. 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements of the accessor, gripper, controllers, and other components, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

With continued reference to FIG. 3, library 10 receives commands from one or more host systems 40, 41, 42. The host systems 40, 41, 42, such as host servers, communicate with the library directly, e.g., on line 80 (e.g., path), through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16, the deep slot cells 100, and the data storage drives 15. The commands are typically logical commands identifying the data storage cartridges or data storage cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessors 18, 28 and/or gripper assemblies 20, 30. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

As illustrated in FIG. 3, the communication processor node 50 is coupled to each of the data storage drives 15 of a storage frame 11, via lines 70, and may communicate with the drives 15 and with host systems 40, 41, 42. Alternatively, the host systems 40, 41, 42 may be directly coupled to the communication processor node 50, at line 80 (e.g., input) for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, lines 80 and 81 are intended to be Ethernet and a SCSI bus, respectively, and may serve as host connections. However, path 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, storage cells 100, data storage drives 15, networks 60, etc.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
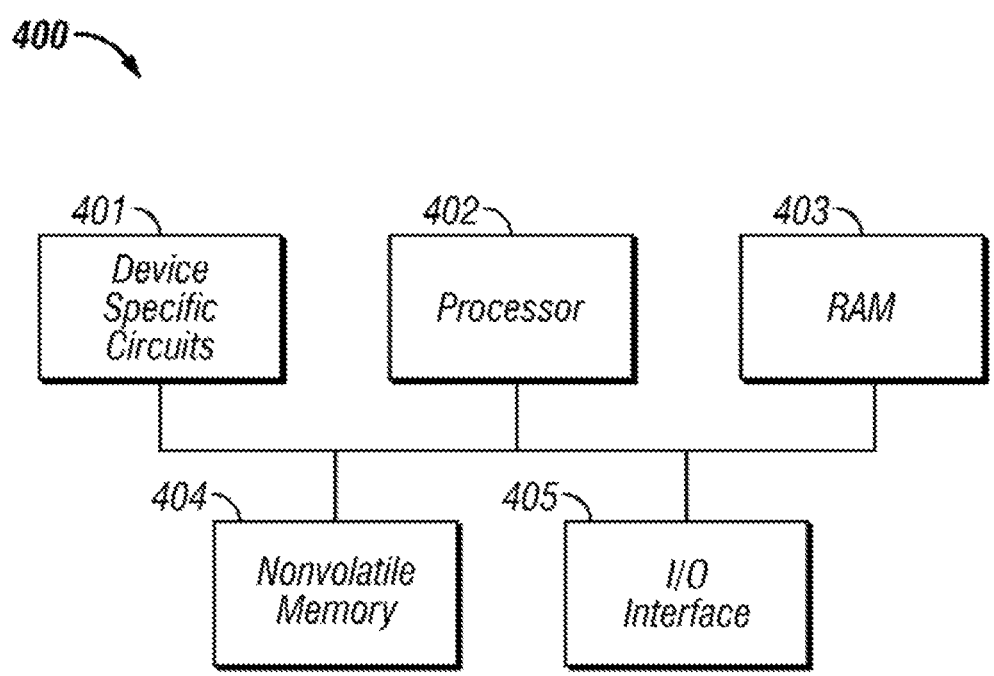
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data containing programming instructions that can be executed to cause the processor 402 to perform certain functions.

In some embodiments, the I/O interface 405 may include a communication interface that allows the processor 402 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The controller 400 may communicate with an external device via the communication interface 405 in any communication protocols such as Automation/Drive Interface (ADI).

The device specific circuits 401 provide additional hardware to enable the controller 400 to perform unique functions including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers, or multiple cores in a processor chip.

Figure 5:
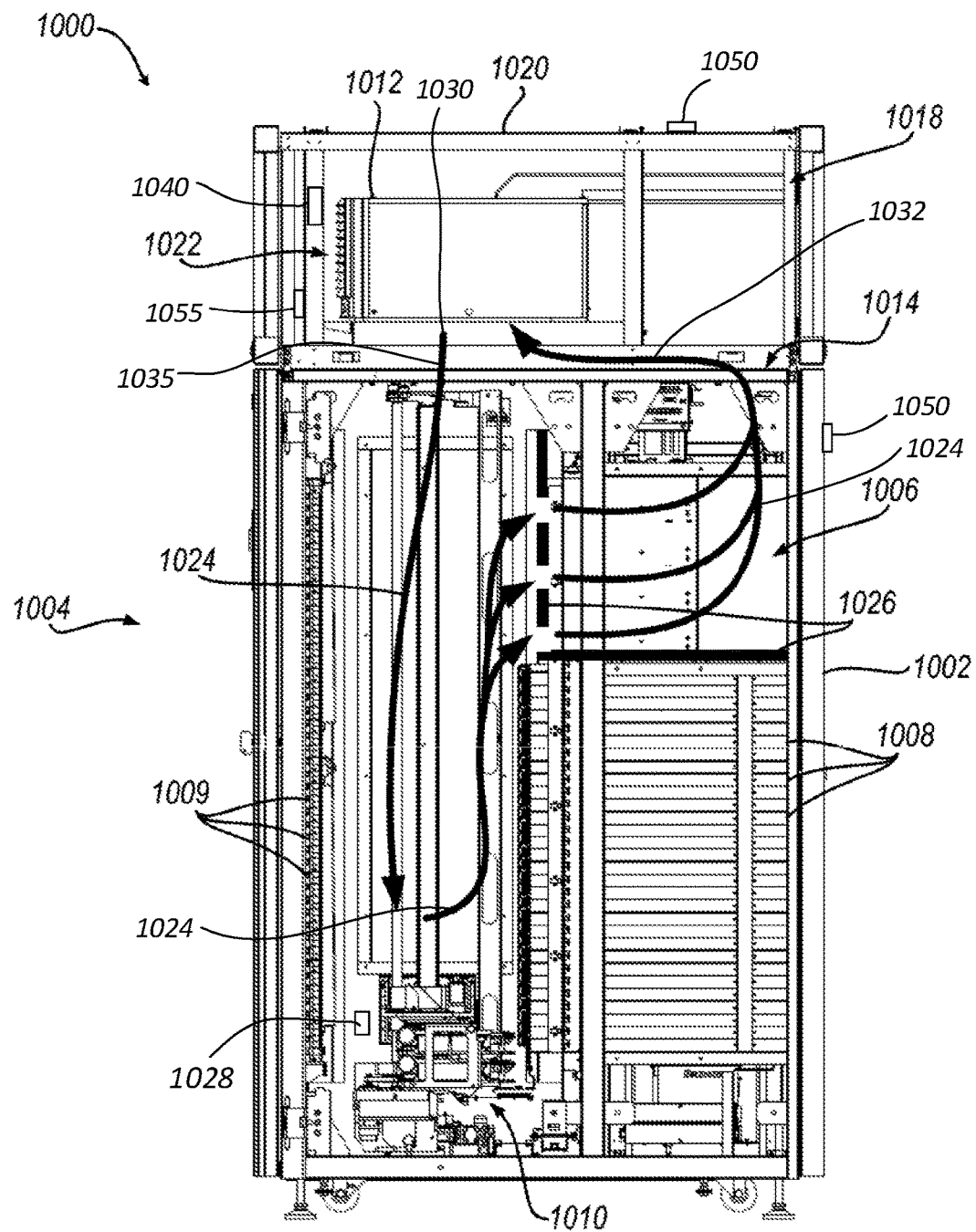
FIG. 5 is a partial side view of one embodiment of a system for storing magnetic recording media.

Referring now to FIG. 5, a system 1000 includes a frame 1002 of an automated data storage library 1004. As described above, automated libraries are typically used to store cartridges and drives in large arrays to store large amounts of data. Thus, an interior of frame 1002 is illustrated as a tape library in one embodiment, and is depicted as including one or more tape drives 1006, an area for storing tape cartridges (e.g., multi-cartridge deep slot cells 1008 and single cartridge storage slots 1009), and a robotic accessor 1010, among other components which would be apparent to one skilled in the art upon reading the present description (e.g., see FIG. 2 above).

System 1000 further includes an optional environmental conditioning unit 1012 associated with the frame 1002. The environmental conditioning unit 1012 may be integrated with and coupled to frame 1002. For the purposes of the present disclosure, it is to be understood that an environmental conditioning unit may be any device which conditions the air and/or the surrounding environment and is able to change the environmental conditions. The environmental conditions may include (but are not limited to) temperature, humidity, pressure, etc. In one embodiment, the environmental conditioning unit may be an air-conditioning unit. In other embodiments, the environmental conditioning unit may be a thermo-electric heater, a thermo-electric cooler, an electric heater, a liquid heater, a liquid cooler, a heat pump, an evaporative cooler, an ionizer, a de-ionizer, a humidifier, a dehumidifier, one or more fans, or any combination thereof. An environmental conditioning unit in accordance with one embodiment of the present disclosure may increase or decrease the temperature, humidity, pressure, etc. The environmental conditioning unit 1012 may be coupled to an upper surface 1014 (e.g., the roof) of the frame 1002 as shown in FIG. 1B and FIG. 5. The environmental conditioning unit 1012 preferably operates without negatively affecting the operating conditions in the frame 1002. Alternatively, an environmental conditioning unit may be functionally associated with the frame 1002 by positioning the environmental conditioning unit elsewhere and using ducts to route the air to the interior of the frame 1002, coupling the environmental conditioning unit to a side of the frame 1002, coupling the environmental conditioning unit to a bottom of the frame 1002 (underneath the frame 1002), etc., depending on the desired approach.

The environmental conditioning unit 1012 is preferably configured such that it may adjust, change and/or regulate the relative conditions (e.g., temperature, humidity, contaminant presence via filtering, etc.) inside the frame 1002. Thus, according to different approaches, the environmental conditioning unit may be able to reduce the temperature of the interior of the frame 1002 and/or reduce the relative humidity of the interior of the frame 1002, depending on the type of environmental conditioning unit 1012 employed. The environmental conditioning unit 1012 is preferably configured to turn on and off as desired to maintain a selected temperature and/or humidity in the interior of the frame 1002. Alternatively, the environmental conditioning unit may have a fan and the fan can be left always on to keep air circulating within the interior of the frame. In one embodiment, the environmental conditioning unit may be an air conditioning unit and the fan may be continuously on and the condenser may turn on and off to maintain a selected temperature and/or humidity in the interior of the frame 1002.

As would be appreciated by one skilled in the art, the environmental conditioning unit 1012 may be an air conditioning unit and may be able to adjust the relative temperature and/or humidity of the interior of the frame 1002 in a conventional manner. Cold air may flow into the interior of the frame 1002 via an inlet air duct 1030 which may connect the environmental conditioning unit 1012 to the interior of the frame 1002, and form an inlet 1035 in the upper surface 1014 of the frame 1002. Specifically, an inlet air duct 1030 may direct the air cooled by the environmental conditioning unit 1012 into the interior of the frame 1002, e.g., where the majority of the data storage media may be stored. As a result, air flow is created from the environmental conditioning unit 1012 to the interior of the frame 1002, as indicated by arrows 1024. This air flow may be induced by a fan included in the environmental conditioning unit 1012 and/or by using the fans in the one or more tape drives 1006 in the frame 1002. Although the air flow is preferably directed from the environmental conditioning unit 1012 to the interior of the frame 1002, and from the interior of the frame 1002 back to the environmental conditioning unit 1012, the particular path that the air flow is shown as extending along in the present embodiment by arrows 1024 is in no way intended to limit the disclosure or the invention.

With continued reference to FIG. 5, system 1000 may include an enclosure 1020 for the environmental conditioning unit 1012. An additional fan 1040 may be included in the enclosure 1020 for passing ambient air over external components of the environmental conditioning unit 1012 to further promote heating, cooling and/or conditioning of the air. Moreover, the enclosure 1020 may include an opening, a baffle or baffles, etc. to direct ambient air exterior to the library 1004 toward an inlet 1022 of the environmental conditioning unit 1012.

In one embodiment, any vents, voids, seams, etc. in the frame 1002 of the library 1004, other than inlet 1035 and an outlet 1032 in an upper surface 1014 of the frame 1002, are preferably sealed such that air from outside the frame 1002 is restricted from entering the interior thereof. The frame 1002 may be sealed using any processes which would be apparent to one skilled in the art upon reading the present description, e.g., including but not limited to inserting foam, implementing insulating seals, etc. New frames may be built without any vents, voids, seams, etc. The housing and panels enclosing the frame 1002 may also be insulated to prevent or inhibit unconditioned air from entering the frame 1002.

The frame 1002 may also include one or more environmental sensors 1050 exterior to the library 1004 and may also include one or more sensors 1055 exterior to the library 1004 but inside the enclosure 1020 for the environmental conditioning unit 1012. In one embodiment the sensors 1055 may be located in front of inlet 1022 of the environmental conditioning unit 1012. The environmental sensors 1050, 1055 may be any sensor appropriate for determining the environmental conditions at the sensor location, such as one or more temperature sensors, one or more humidity sensors, one or more pressure sensors, etc. The one or more environmental sensors 1050, 1055 may be in communication with a library controller, such as library controller 400 shown and described with respect to FIG. 4. The one or more signals provided by the environmental sensors 1050, 1055 may be utilized to control the output and operation of the environmental conditioning unit 1012. Although the embodiment illustrated in FIG. 5 includes a single frame 1002 and a single environmental conditioning unit 1012, other embodiments may include additional frames and/or environmental conditioning units.

System 1000 illustrated in FIG. 5 may further comprise one or more environmental sensors 1028 disposed within the interior of the library 1002. The environmental sensor(s) may be any appropriate sensor for determining the environmental conditions within the frame 1002, such as one or more temperature sensors, one or more humidity sensors, one or more pressure sensors, etc. The one or more environmental sensors 1028 may be in communication with a library controller, such as controller 400 shown and described with respect to FIG. 4. As such, the signal provided by the one or more environmental sensors 1028 may be utilized to control the output and operation of the environmental conditioning unit 1012.

Although the embodiment illustrated in FIG. 5 includes a single frame 1002 and a single environmental conditioning unit 1012, other embodiments may include additional frames and/or environmental conditioning units.

While a data storage library having an associated, preferably integrated environmental conditioning unit advantageously controls the environmental conditions within the library, some challenges may exist when components within such a data storage library need to be serviced or replaced. As noted above, many data centers are now maintained at higher temperatures and higher humidity levels to reduce the costs relating to cooling the environment where the data storage library is located, e.g., the data center. For this reason, environmental conditions of the data center may be substantially different from those within a data storage library having an associated environmental conditioning unit which controls the environmental conditions within the data storage library. As such, a component (such as a data storage cartridge, tape drive, accessor, etc.) that is moved abruptly from, for example, the warm, humid environment of the data center to the cool, dry environment of the data storage library may develop condensation on surfaces thereof. Additionally, moving a component (such as, for example, a data storage cartridge) from the cool, less humid environment of the data storage library to the warmer, more humid data center may also develop condensation on surfaces. Moisture build-up on surfaces of sensitive components such as data storage cartridges and tape drives is undesirable, as moisture may adversely affect performance and/or lead to failure of the components and/or data loss. Tape cartridges and magnetic tape media may be susceptible to the formation of condensation which may negatively impact the performance of a tape library.

Thus, in accordance with aspects of the present disclosure, one or more acclimation chambers may be associated with the data storage library so as to gradually acclimate components (e.g., data storage cartridges, replacement data storage drives, accessors, power supplies, library controllers, etc.) that are placed in the acclimation chamber for transport between the environmental conditions of the data storage library and the environment external to the data storage library, e.g., the data center. The acclimation chamber may permit components to be gradually acclimated when they are to be moved from a first environment (e.g., a hot and humid data center) into a second environment (e.g., a cool and dry data storage library), thereby impeding, resisting, inhibiting and/or preventing the formation and/or accumulation of condensation on or within the transferred components. Similarly, the one or more acclimation chambers may also gradually acclimate the components when they are to be moved from the second environment (e.g., a cool and dry data storage library) into the first environment (e.g., a hot and humid data center). Additionally, the one or more acclimation chambers may be configured and operate so as to allow a person to access the interior of the data storage library to perform maintenance, import (insert) data storage cartridges, export (remove) data storage cartridges, etc., without introducing undesirable environmental conditions into the environmentally-controlled data storage library. In one embodiment the acclimation chamber may rely upon osmosis to gradually acclimate the environmental conditions in the acclimation chamber to the desired parameters. The acclimation chamber in one or more embodiments may have one or more ducts, baffles, portals, openings and/or vents (herein referred to as vents) in communication with one or both of the interior and/or exterior environment of the data storage library. A moveable door, baffle, and/or barrier may be selectively displaceable relative to the vents to facilitate gradually adjusting environmental conditions within the acclimation chamber. In alternative embodiments, to gradually change the environment within the acclimation chambers, the acclimation chamber(s) may be associated with and/or incorporate one or more environmental control devices therein, such as an electric heater, a thermoelectric heater, a thermoelectric cooler, a liquid heater, a liquid cooler, an air conditioner, a heat pump, an evaporative cooler, an ionizer, a deionizer, a humidifier, a dehumidifier, one or more fans, filters, or any known environmental device, and combinations thereof.

In one aspect, the one or more acclimation chambers may be formed within one or more service bays associated with the data storage library. The service bay(s) may include one or more environmental barriers capable of being deployed so as to resist, impede, inhibit, and/or prevent environmental conditions from intruding into the service bay and/or establish and/or maintain an environmental separation between the interior of the active library frame(s) of the data storage library and the interior of the service bay(s). In one example, one or more the environmental barriers may help and/or facilitate insulating, separating and/or isolating the environmental conditions within the acclimation chamber (e.g., the portion of or entirety of the service bay) from the interior of the active, operational library frame(s) and/or the exterior of the library system.

Figure 6A:
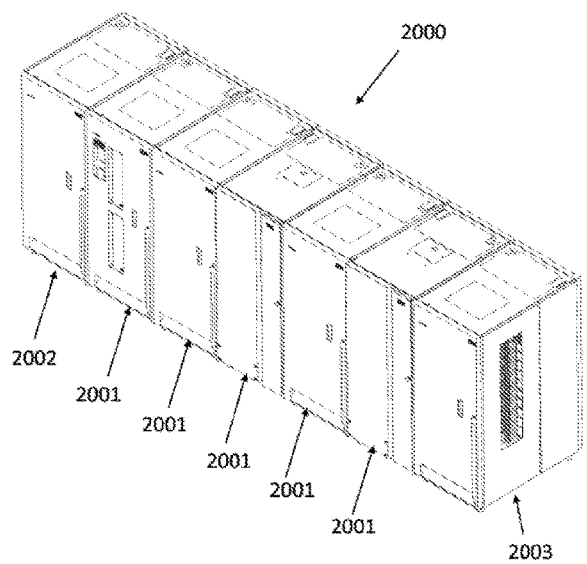
FIG. 6A is a perspective view of an automated data storage data storage library in accordance with one embodiment.
Figure 6B:
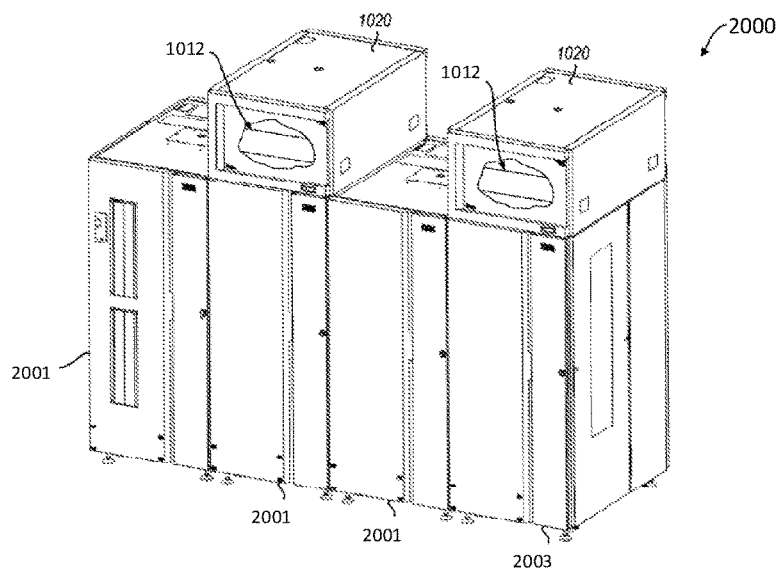
FIG. 6B is a perspective view of an automated data storage data storage library in accordance with another embodiment

Referring to FIGS. 6A and 6B, a data storage library 2000 in accordance with an aspect of the present disclosure is illustrated. Data storage library 2000 in FIG. 6A is shown as a seven-frame data storage library having a plurality of primary library frames 2001, a left-hand service bay 2002, and a right-hand service bay 2003. However, it is to be understood that more or less primary library frames 2001 may be present in data storage library 2000, and one of service bays 2002, 2003 may be omitted. Library frames 2001 may comprise conventional data storage library componentry, similar to that which is found in library 10 described above with respect to FIG. 2. For instance, one or more of library frames 2001 may comprise a plurality of storage slots to hold data storage cartridges associated with data storage media, one or more data storage drives, and one or more robotic accessors. Service bays 2002, 2003 may also comprise similar componentry to that which is found in service bays 13, 14 in library 10 described above with respect to FIGS. 1A-1B. Furthermore, data storage library 2000 optionally may be equipped with one or more environmental conditioning units, as illustrated in FIG. 6B, such as that described above with respect to data storage library 10 in FIG. 1B and 1004 in FIG. 10. In one embodiment, it is contemplated that the data storage library will be a tape library which may include tape cartridges, tape drives, and accessors.

The respective library frames 2001 and service bays 2002, 2003 may be in environmental communication with one another. For example, openings may be formed between each adjacent library frame 2001 and the service bays 2002, 2003 such that the environmental conditions within the entirety of data storage library 2000 may be substantially consistent throughout. Furthermore, one or more robotic accessors may travel between adjacent library frames 2001 and to and into service bays 2002, 2003, and the data storage library may have a customizable capacity.

Figure 7:
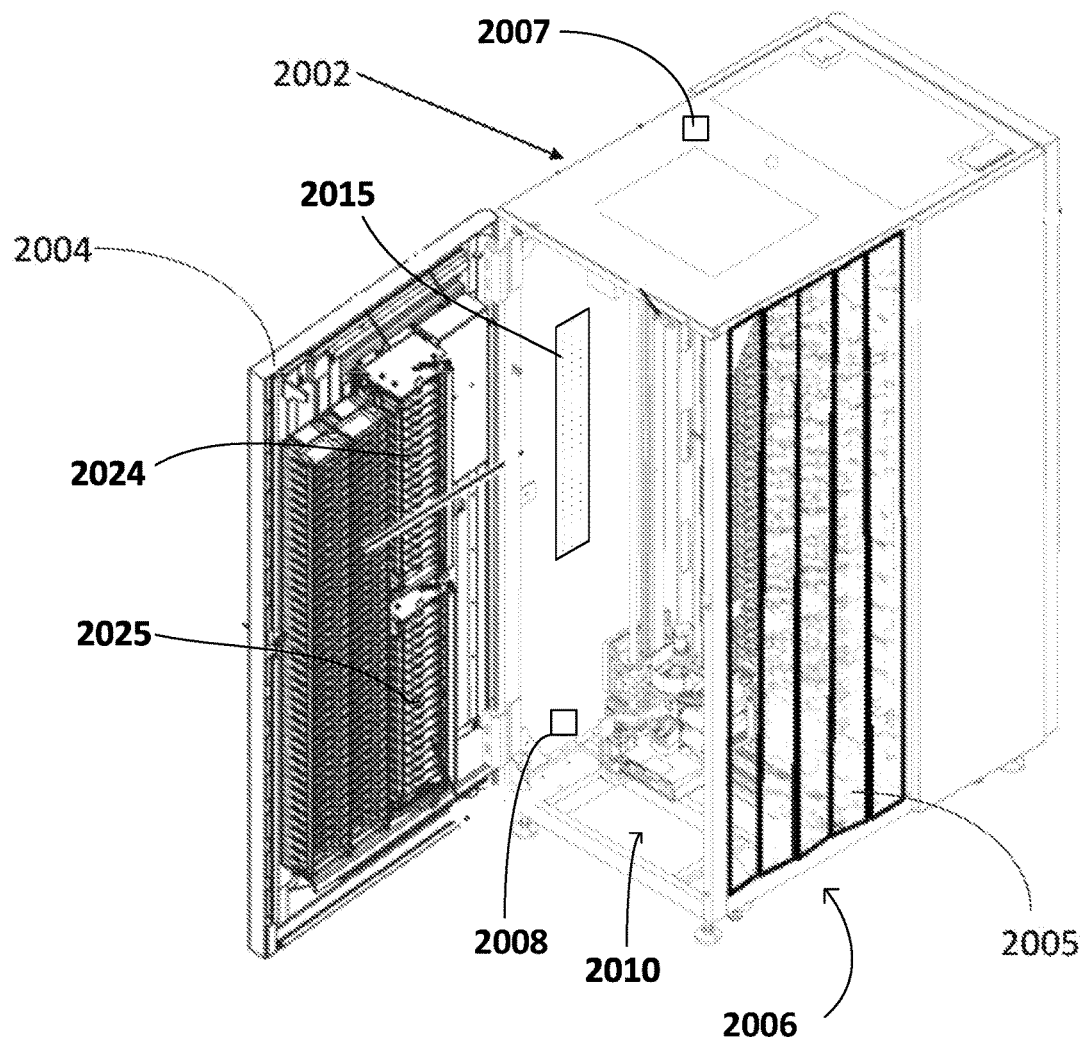
FIG. 7 is a perspective view of the service bay and acclimation chamber of FIGS. 6A & 6B.

While the adjacent library frames 2001 and service bays 2002, 2003 are configured to be in environmental communication with one another, e.g., through openings, in accordance with an aspect of the present disclosure, the respective service bays 2002, 2003 each comprise an environmental barrier capable of at least partially insulating, isolating, and/or separating the environmental conditions within the respective service bays 2002, 2003 from the environmental conditions within library frames 2001 and the exterior of the data storage library 2000 to form an acclimation chamber 2010 (FIG. 7). The environmental barrier may impede, resist, inhibit and/or prevent environmental conditions from inside the library from intruding into the interior of the respective service bays. For example, FIG. 7 illustrates service bay 2002 having an opening 2006 in the service bay 2002 whereby the accessor communicates with the adjacent library frames 2001. Service bay 2002 further comprises an environmental barrier 2005 disposed within opening 2006. The environmental barrier 2005 may comprise a door, a hanging panel, a sliding panel, a hinged panel, hanging slats or flaps (similar to vertical blinds), a split membrane, an air curtain, or any other suitable environmental barrier capable of establishing and/or maintaining two different environments on respective sides thereof; and/or impeding, resisting, inhibiting and/or preventing environmental conditions from inside the library frame from intruding into the service bay, or vice versa. It is to be understood that service bay 2003 may be similarly constructed and may also comprise an environmental barrier 2005.

Deployment of the environmental barrier 2005 may be accomplished either manually or automatically. For example, the environmental barrier 2005 may be manually placed by an operator (e.g., prior to a service operation, prior to a data storage cartridge import/export operation, etc.) by, e.g., pushing or pulling a panel into place or closing a door in an opening between a service bay and an adjacent library frame. Alternatively, the environmental barrier 2005 may be moved into place by certain movements of a robot accessor. For instance, a passing robot accessor may activate a latch or grasp a panel as it moves between a service bay and adjacent library frame, thereby deploying the environmental barrier 2005. The environmental barrier 2005 may also be moved into place by the library controller via a mechanical control device (e.g., motors or actuators). Still further, the environmental barrier 2005 may be permanently in place and the library accessor(s) may be capable of passing through the barrier (e.g., through hanging slots or an air curtain).

The data storage library 2000 may continue to operate normally when one or both of service bays 2002, 2003 are being used as an acclimation chamber 2010. For example, the library may have more than one accessor such that at least one accessor is available for normal operation within the library frames 2001, while one or more other robotic accessors are disposed within one or both of service bays 2002, 2003 for service. Alternatively, if the accessor is not in need of service, the one or both of service bays 2002, 2003 may be used as an acclimation chamber 2010 for other componentry (such as, e.g., data storage cartridges, data storage drives, power supplies, library controllers, Fibre Channel switches, Ethernet switches, etc.), and the one or more accessors may be prevented from entering one or both of service bays 2002, 2003 when they are being used as an acclimation chamber.

In one example, the service bay 2002 may be normally open to the rest of the library frames 2001 such that the environmental conditions within the service bay 2002 are the same or similar to the environment, preferably conditioned environment, of the rest of the data storage library 2000. That is, the barrier 2005 is not in place, the opening 2006 is not blocked and/or restricted, and the interior of the service bay 2002 communicates with the interior of the library frame 2001. When an accessor requires service, it is moved (either manually or automatically) into service bay 2002. In response to and/or after entry of the accessor into the service bay, an environmental barrier 2005 may be positioned to create a physical environmental barrier between the service bay 2002 and the rest of the data storage library 2000 according to any of the deployment methods described above. The environmental conditions within the service bay 2002 are then changed to begin the acclimation process. The different manners, methods, and processes by which the environmental conditions within the acclimation chamber 2010 may be adjusted and/or changed will be discussed later in the disclosure. The acclimation chamber 2010 (service bay 2002) gradually acclimates to be at, near, and/or within a range of the ambient environment (i.e., the environment outside the library), or one or more desired environmental conditions of the ambient environment (e.g., temperature and/or humidity), and thereafter the service bay door 2004 may be opened and repairs to the accessor may begin. Alternatively, and/or additionally, service may be performed and/or componentry passed into the service bay 2002 through barrier 2005 and/or through import/export (I/O) stations 2024, 2025.

The determination of whether or not environmental conditions within the acclimation chamber 2010 (service bay 2002) are properly acclimated to the environmental conditions outside the library may be made through any appropriate method, such as the passage of a predetermined amount of time after the barrier is deployed, or through the use of one or more environmental sensors, both outside of and within the service bay 2002 (e.g., within acclimation chamber 2010). For example, one or more environmental sensors 2007 (e.g., temperature sensor(s), humidity sensor(s), etc.) may be placed outside of service bay 2002 so as to determine the ambient environmental conditions of where the library is operated (e.g., the surrounding data center), while one or more environmental sensors 2008 (e.g., temperature sensor(s), humidity sensor(s), etc.) may be placed within service bay 2002 so as to determine the environmental conditions within the service bay 2002. In addition, one or more environmental sensors (e.g., temperature sensor(s), humidity sensor(s), etc.) may be placed outside acclimation chamber 2010 (service bay 2002) but inside library 2000 (e.g., in an adjacent frame 2001) so as to determine the environmental conditions within the library frame, e.g., the conditioned portion of library 2000.

After repairs are completed and components are inserted or removed, etc., the service bay door 2004 may be closed (if opened) and the reverse acclimation process may be triggered. Once the acclimation chamber 2010 (service bay 2002) has acclimated to the conditioned environment (e.g., the environment inside the data storage library), the environmental barrier 2005 may be removed, either completely or partially, and components may be moved freely between the acclimation chamber 2010 (service bay 2002) and other areas of the library (e.g., cartridges may be moved or the accessor may return to active usage within the data storage library 2000, and may also operate freely within the service bay 2002). While FIG. 7 illustrates environmental barrier 2005 placed such that the entirety of service bay 2002 is separated and/or isolated so as to form an acclimation chamber 2010, it is to be understood that environmental barrier 2005 may be placed at an alternative location within service bay 2002 such that only part of service bay 2002 may be utilized as an acclimation chamber (e.g., only half of the frame).

The acclimation process and/or alternating the acclimation chamber between an ambient external environment and a conditioned internal environment may be initiated manually. For example, an operator may press a button or select an option on a user interface (e.g., a web user interface, operator panel 23 in FIGS. 1A and 1B, etc.) of the data storage library. In another example, an operator may initiate a service procedure and that service procedure may result in the acclimation chamber environment being modified. Alternatively, the acclimation process and/or alternating the acclimation chamber between environmental conditions at, near, and/or within a range of the ambient external environment and a conditioned internal environment may be initiated automatically. For example, an accessor failure may result in the acclimation chamber environment being modified after the accessor has moved (or has been manually moved) into a service bay.

In an alternative aspect, one or more of the service bays 2002, 2003 may be used as an acclimation chamber 2010 for acclimation of data storage cartridges. For example, if an operator determines there is a need to insert data storage cartridges, data storage drives, and/or accessors into (or out of) the library, the operator may indicate to the data storage library 2000 that one or more of the service bays 2002, 2003 should be prepared for opening to the ambient environment (e.g., by selecting an option on an operator panel 23 in FIGS. 1A and 1B of the data storage library). Alternatively, the acclimation chamber may already be at an ambient state, either due to the ambient state being a default state for one or more of the service bays 2002, 2003, or due to one or more of the service bays 2002, 2003 being left in an ambient state after a previous operation. Once the one or more of the service bays 2002, 2003 are ready to act as an acclimation chamber (e.g., the environmental barrier 2005 has been moved to restrict, impede, and/or block the opening 2006 and insulate, separate, and/or isolate the environment inside the acclimation chamber from the environment inside the active and/or operational library frames), the operator may open the door 2004 to the one or more of service bays 2002, 2003 acting as the acclimation chamber 2010, insert one or more data storage cartridges, data storage drives, accessors, actuators, controllers and/or other componentry and close the door 2004.

Alternatively, an operator may open an I/O station door (e.g., a door associated with upper I/O station 2024 and/or lower I/O station 2025), rather than opening door 2004, insert one or more data storage cartridges into the I/O station, and close the I/O station door. Other than the difference in which door is opened, the steps are the same. Herein, door refers to a library main door, a library secondary door, an I/O station door, or any other door, panel, hatch, portal, etc. for purposes of accessing any part of the interior of the library acclimation chamber. A door may have a locking device that prevents the door from being opened until the environmental conditions inside the acclimation chamber are at, near, and/or within a range of the ambient external environment. In addition or alternatively, there may be one or more visual indicators (e.g., text on a screen or lights) and/or audio indicators (e.g., beeper, horn or alarm) associated with a door to indicate when the environmental conditions inside the acclimation chamber are (or are not) at, near, and/or within a range of the ambient external environment. While the barrier 2005 has been described as selectively deployable it will be appreciated that the barrier 2005 may remain in place and be configured so that the accessors and other componentry could pass through the barrier.

The one or more service bays 2002, 2003 may then begin the acclimation process by changing the one or more desired environmental conditions from an ambient external environment to a conditioned internal environment of the active data storage library frame(s). This may be triggered manually (e.g., an operator presses a button or accesses a user interface associated with the data storage library), or it may be triggered automatically (e.g., by the closing of the service bay door 2004).

The environmental conditions within the one or more service bays 2002, 2003 forming the acclimation chamber 2010 may be changed through any appropriate method, such as though activation of one or more environmental control devices, e.g., fans, heaters, coolers, etc. The acclimation chamber 2010, and the process by which the environmental conditions adjust within the acclimation chamber 2010 to the conditions within the interior of the data storage library 2000, and more specifically the conditioned environment of the library frames 2001, preferably occurs gradually to inhibit and/or prevent the formation and/or accumulation of condensation and/or moisture on or within the data storage cartridges. Once the environmental conditions within one or more of service bays 2002, 2003 are suitably similar to the environmental conditions within the conditioned portions of data storage library 2000, and/or the data storage cartridges and/or other componentry has at least acclimated to be at, near and/or within a range of the environmental conditions of the acclimation chamber 2010 (e.g., the data storage cartridges and/or other componentry has remained in the acclimation chamber a sufficient time period, which may be predetermined and/or calculated in real-time based upon the actual internal and external environmental conditions of the data storage library), the data storage cartridges, data storage drives, accessors, actuators, controllers, and/or other componentry may be moved throughout the data storage library 2000 by one or more accessors in a conventional fashion.

According to another aspect, the data storage library acclimation chamber (or chambers) is not limited to service bays or end frames. For example, any frame of data storage library 2000 may be utilized as a library acclimation chamber in order to access and/or transport data storage drives, data storage cartridges, library controllers, power supplies, malfunctioning robot accessor(s), or any other component of the data storage library 2000 that may reside in, be placed in, and/or removed from a library frame. In such a configuration, depending upon the configuration of the data storage library system, there may be one or more, for example, two environmental barriers, similar to environmental barriers 2005 described above associated with the data storage library system. For example, frame 2002 in FIG. 7 may be an operational data storage frame similar to frame 11 in FIG. 2 and/or frame 1002 in FIG. 10 and be located at the end of a plurality of frames constituting a data storage library system. Active, operational data storage frame 2002 may have one barrier 2005 associated with opening 2006 to form an acclimation chamber 2010 as described above with respect to service bay 2002.

Alternatively, in another embodiment, active, operational data storage frame (or service bay) may be located in the interior of a line of active data storage frames and/or service bays and may have two or more barriers 2005 similar to those shown and described in connection with FIG. 7. In this example, the first barrier 2005 may be located and operate as shown and described in connection with FIG. 7 and a second barrier 2005' would be associated with and deployable to restrict and/or block a second opening (not shown) which would be associated with the interior active library frame (or service bay)) and may be located, for example, in place of the wall in which panel 2015 is illustrated in FIG. 7. In this manner, barriers 2005, 2005' may be associated with and/or operable to be selectively deployable with one barrier for each side of the active, operational library frame (or service bay) to insulate, separate, and/or isolate the interior library frame (or service bay) to create an acclimation chamber. The barriers 2005, 2005' preferably resist, impede, inhibit and/or prevent environmental conditions, e.g., temperature and/or humidity, from the interior of the library from intruding into the acclimation chamber, and vice versa.

While the barriers 2005, 2005' are described as selectively deployable it will be appreciated that the barriers 2005, 2005' may remain in place and be configured so that the accessors and other componentry could pass through the barriers. Furthermore, the data storage library may continue to operate normally while the library frame is being used as an acclimation chamber. For example, the environmental barrier may allow an accessor to enter (and/or pass through) the acclimation chamber as it delivers and retrieves data storage cartridges from throughout the data storage library, with the accessor being constructed so as to handle potentially extreme and sudden changes in the environmental conditions between the acclimation chamber and the operational library frames. In another example, the data storage library may continue to operate using all frames except the data storage library frame being used as the acclimation chamber. Furthermore, instead of using an entire data storage frame as an acclimation chamber, only part of the data storage frame may be used (e.g., half of the frame). Additionally, the data storage library acclimation chamber may not be limited to a single data storage frame or a partial data storage frame, but may instead comprise one, some, a plurality of or all of the data storage frames.

In yet another aspect of the present disclosure, the data storage library acclimation chamber may comprise a rear service area of one or more of the library frames 2001 and/or service bays 2002, 2003. Such a configuration may be useful when an operator needs to access only part of a library frame. For example, it may be desirable to add or remove tape drives in a particular library frame. Or, it may be desirable to service components in the back of a data storage library frame (e.g., library controllers, power supplies, data storage drives, storage slots, etc.). In another aspect, the data storage library acclimation chamber may comprise the front (i.e., the storage and robotic accessor area) of the data storage library frames of data storage library 2000.

In one embodiment of the present disclosure, the data storage library acclimation chamber may achieve environmental acclimation passively, i.e., through passive communication with the ambient environment. For example, one or more external vents, and/or portals (e.g., small openings) associated with and/or configured in the data storage library acclimation chamber to be in communication with the exterior of the data storage library may be selectively opened to permit (or closed to impede) ambient air from outside the data storage library to flow into the acclimation chamber, either to bring the environmental conditions within the acclimation chamber to be at, near, and/or with a range or threshold of the ambient external environmental conditions, or as part of an acclimation process. Additionally, and/or alternatively, one or more internal vents, portals, (e.g., small openings) associated with and/or configured in the data storage library acclimation chamber to be in communication with the interior of the data storage library may be selectively opened to permit (or closed to impede) conditioned air from inside the data storage library to flow into the acclimation chamber, either to bring the environmental conditions within the acclimation chamber to be at, near, and/or within a range or threshold of the environmental conditions inside the data storage library, or as part of an acclimation process. A door, baffle and/or barrier may be operatively associated with the vents, portals, openings, etc., and may be operated manually (e.g. by the operator) or automatically (e.g., by a data storage library controller, motor, actuator and/or accessor) to open or close the openings and/or portals.

Alternatively, the data storage library acclimation chamber may achieve environmental acclimation through one or more active environmental control devices, e.g., fans. For example, a fan may move air from the ambient environment (i.e., the environment outside the data storage library) into the data storage library acclimation chamber either to prepare the chamber for an ambient external state and/or as part of an acclimation process. Additionally, and/or alternatively, a fan may move air from the conditioned environment (i.e., the environment inside the data storage library) into the data storage library acclimation chamber to either prepare the chamber for a conditioned internal state and/or as part of an acclimation process. One fan may be used to move ambient air into the data storage library acclimation chamber and another fan may be used to move conditioned air from inside the library into the data storage library acclimation chamber. Alternatively, a single fan could be used for both actions simply by changing the direction of the fan rotation. For example, a single fan could be associated with an external surface of the acclimation chamber (e.g., top surface of frame 2002). When the fan is rotating in one direction, ambient air moves from outside the library into the acclimation chamber. When the fan is rotating in the opposite direction, air moves from inside the acclimation chamber to the outside of the library, which creates a low pressure that may cause conditioned air to move from adjacent library frames into the acclimation chamber. The fan(s) may be activated manually (e.g., by operator activation) or they may be activated automatically (e.g., by a data storage library controller). The fans may have a fixed air flow or they may have a variable airflow to allow the acclimation to be controlled by increasing or decreasing the air flow.

Still further, the data storage library acclimation chamber may achieve acclimation through the use of other environmental control devices, as described above. For example, there may be a thermoelectric heater and/or cooler associated with the acclimation chamber, with the thermoelectric heater and/or cooler acting as an environmental control device to assist with acclimation chamber preparation and/or an acclimation process. Furthermore, the acclimation chamber may comprise multiple environmental control devices. For example, there may be one or more fans, electric heaters and/or air conditioners. Such environmental control device(s) may be activated manually (e.g., by operator activation) or they may be activated automatically (e.g., by a data storage library controller). Additionally, and/or alternatively, the acclimation chamber may be associated with and receive conditioned air from the environmental conditioning unit associated with the data storage library system.

There may also be environmental sensors (e.g., temperature, humidity, etc.) associated with, in, or around the data storage library acclimation chamber; associated with, in, or around interior areas of the data storage library; associated with, in, or around any environmental control devices; and/or associated with, in, or around the exterior of the data storage library. Such environmental sensors may allow environmental conditions to be monitored and/or controlled during preparation of the acclimation chamber and/or an acclimation process. The monitoring and/or control may be performed by a controller in the data storage library associated with the acclimation chamber; with one or more environmental control devices; a data storage library controller; and/or another control system.

The processes described herein may be performed utilizing one or more embodiments of the acclimation chamber(s) described herein or by any other acclimation chamber, including acclimation chambers that are not disclosed herein. In one embodiment of the method of acclimating one or more components for insertion into or removal from a data storage library, the components are inserted into an acclimation chamber, such as, for example, the acclimation chamber shown and described above in FIG. 7, or other undisclosed acclimation chamber, at first environmental conditions. Both the acclimation chamber and the components inserted into the acclimation chamber are preferably at the same first environmental conditions, for example, the same temperature and/or humidity level. However, there may be a temperature and/or humidity differential between the interior of the acclimation chamber and components inserted into the acclimation chamber. The interior of the acclimation chamber and the components inserted therein are acclimated to second environmental condition(s). For example, the temperature and/or humidity levels at first environmental conditions may be different than the temperature and/or humidity levels at the second environmental conditions. And, the components are removed from the acclimation chamber. In one embodiment, the components may be inserted into the chamber and held in the acclimation chamber for a sufficient period of time to acclimate to the second environmental conditions. The time period may be a predetermined time period, for example, twenty-four (24) hours. The predetermined time period preferably is sufficient to permit the components to sufficiently acclimate. The amount of time provided to acclimate may be more or less then twenty-four (24) hours.

The time period could also vary and be set depending upon the environmental conditions between the various environments (e.g., inside and outside the library). For example, the amount of time that is provided to acclimate the components in the acclimation chamber may depend upon the interior conditions inside the library, the exterior conditions outside the library and/or both. A look-up table could be used or calculations performed to determine the amount of time the component(s) stay inside the acclimation chamber before they are removed. Sensors may be employed to measure the conditions inside and outside the library. In another aspect, the process may involve including data on the interior conditions inside the acclimation chamber. Again sensors may be employed to measure conditions within the interior of the acclimation chamber.

In embodiments, the acclimation chamber may be acclimated so that interior is at the desired environmental conditions, e.g., at or close to the exterior library conditions, or at or close to the interior library conditions. To acclimate the acclimation chamber to desired conditions before the components are inserted within the acclimation chamber, the acclimation chamber may be arranged in a desired configuration that favors acclimation for a predetermined period of time. For example, the acclimation chamber may set for about twenty-four (24) hours before the components are inserted into the acclimation chamber. In alternative embodiments, sensors may be employed to set the amount of time that the acclimation chamber is acclimated.

In other embodiments, measurements of environmental conditions are made and/or calculated, including comparisons of measurements, to determine whether or not environmental conditions are at, near or within a desired range and/or threshold of a desired environmental condition. In one aspect, one or more sensors may be used to make the measurements, and a processor and/or controller including library processors and/or controllers may be utilized.

Figure 8:
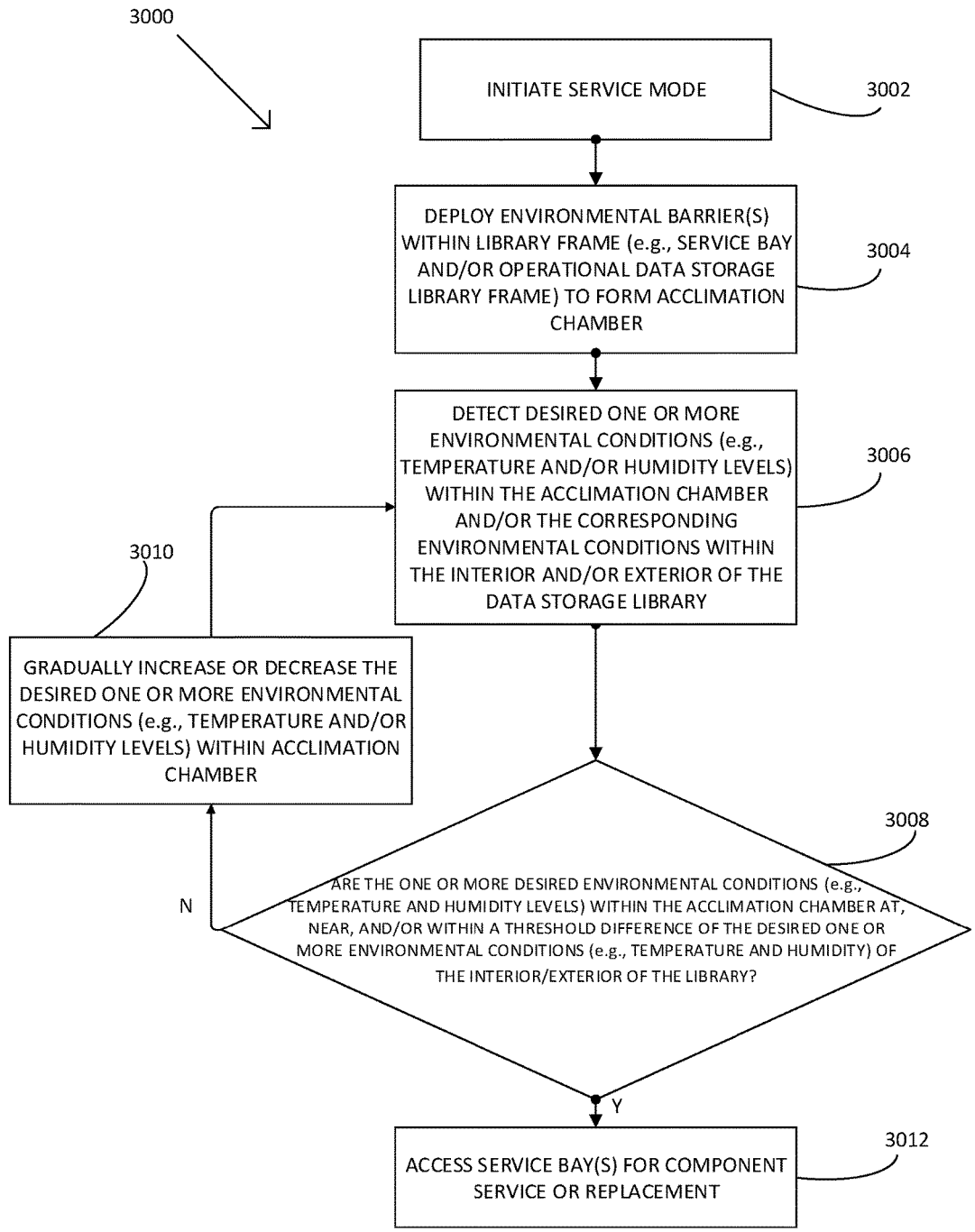
FIG. 8 is a flowchart of a method of acclimating one or more service bays in accordance with one embodiment.

Referring to FIG. 8, process 3000 for acclimating one or more components for transport into and/or out of a data storage library is described in accordance with one aspect of the present disclosure. The process may be used to service, provide and/or retrieve components (e.g., data storage cartridges, robot accessors, library controllers, power supplies, etc.) of a data storage library. While the process may be considered for the sake of convenience and not with the intent of limiting the disclosure as comprising a series and/or number of steps, it will be appreciated that the process does not need to be performed as a series of steps and/or the steps do not need to be performed in the order shown and described, but may be performed as an integrated process, a series of steps, in the order described or in an alternative order. At 3002, a service mode may be initiated, either manually or automatically, in accordance with any of the above-described methods. At 3004, one or more environmental barriers are deployed within at least one of the service bays and/or active, operational frames of the data storage library so as to form an acclimation chamber and environmentally insulate, separate, and/or isolate at least a portion of the one or more service bays and/or operational frames from the environmental conditions within the other library frames. Deployed may refer to placing, moving, enabling, engaging, activating, closing, etc. an environmental barrier, as discussed previously. In addition, a permanent barrier (e.g., hanging slots or a split membrane) may be deployed by default and may become temporarily undeployed when an accessor or another component of the data storage library passes therethrough. The barriers preferably operate to resist, impede, inhibit, and/or prevent environmental conditions, e.g., temperature and/or humidity, from within the interior of the library from intruding into the acclimation chamber, and vice versa.

At 3006, the desired one or more environmental conditions of concern (e.g., temperature and/or humidity levels) within the acclimation chamber are determined (e.g., via environmental sensors), and/or corresponding one or more environmental conditions associated with the interior and/or exterior of the data storage library. At 3008, the desired one or more environmental conditions (e.g., the temperature and/or humidity) within the acclimation chamber are compared with the corresponding environmental conditions (e.g., temperature and/or humidity) in the interior and/or exterior of the data storage library to determine if they are at, near, and/or within a desired range or threshold of each other. The threshold may be predetermined or may be subject to calculations based upon the external and/or internal conditions of the library. If the environmental conditions (e.g., temperature and/or humidity levels) within the acclimation chamber are at, near, and/or within a range or threshold of the corresponding environmental conditions within or outside the data storage library, the acclimation process is complete and the acclimation chamber may be accessed by either an operator or an accessor at step 3012.

If at 3008, the environmental conditions (e.g., temperature and/or humidity levels) within the acclimation chamber are not at, near, and/or within the desired threshold or desired range of the corresponding environmental conditions within or outside the data storage library, then the environmental conditions (e.g., temperature and/or humidity levels) within the acclimation chamber are gradually increased or decreased, at 3010, so as to be at, near, and/or with a desired range or threshold of the corresponding environmental conditions (e.g., the temperature and/or humidity levels) outside of or within the data storage library, dependent upon the direction of acclimation desired. The environmental conditions (e.g., temperature and/or humidity levels) may be increased and/or decreased via any of the environmental control devices described above, by actively employing vents, portals, or small openings that communicate with the desired environmental conditions (interior or exterior of the library) to speed up and/or facilitate the acclimation process, or simply through exposure to the environmental conditions within the acclimation chamber which may have been created by the barrier in part insulating, separating and/or isolating the interior and exterior environments, and optionally adjusting the environmental conditions of the acclimation chamber to be at, near, and/or within a desired range or threshold of the environmental conditions inside of and/or outside of the data storage library (by, for example, relying on convective and/or conductive heating/cooling, active environmental control devices, and/or the associated environmental conditioning unit(s)).

Figure 9:
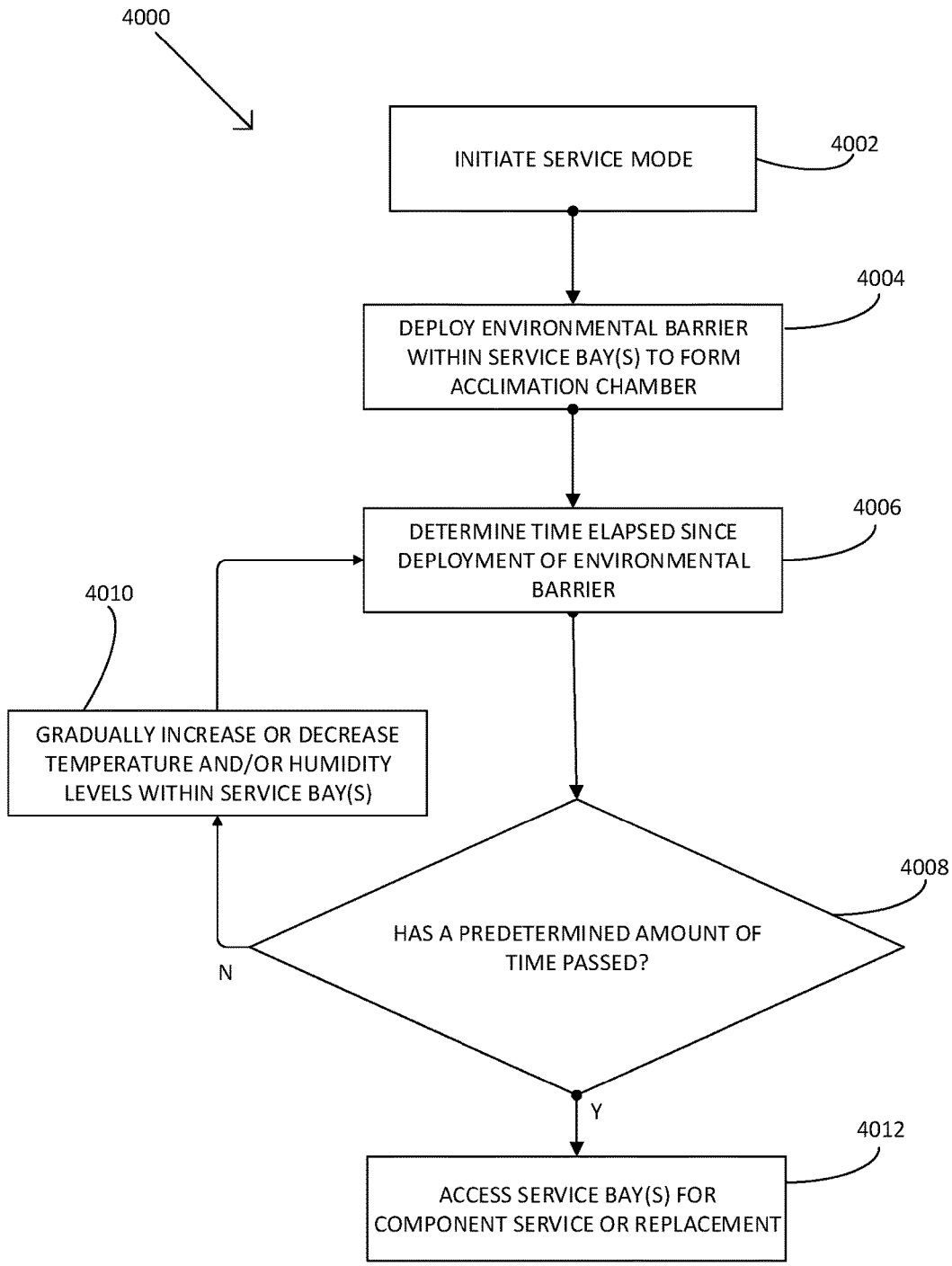
FIG. 9 is a flowchart of a method of acclimating one or more service bays in accordance with another embodiment.

Referring now to FIG. 9, a process 4000 in accordance with another embodiment for acclimating components in an acclimation chamber is disclosed. At 4002, a service mode is initiated, either manually or automatically, in accordance with any of the above-described methods. While the process may be considered for the sake convenience and not with the intent of limiting the disclosure as comprising a series and/or number of steps, it will be appreciated that the process does not need to be performed as a series of steps and/or the steps do not need to be performed in the order shown and described, but may be performed as an integrated process, a series of steps, in the order described or in an alternative order. At 4004, one or more environmental barriers are deployed within at least one of the service bays and/or active, operational library frames of the data storage library system so as to form an acclimation chamber and environmentally insulate, separate, and/or isolate at least a portion of the one or more service bays and/or active, operational library frames from the environmental conditions within the other library frames. Deployed may refer to placing, moving, enabling, engaging, activating, closing, etc. an environmental barrier, as discussed previously. In addition, a permanent barrier (e.g., hanging slots or a split membrane) may be deployed by default and may become temporarily undeployed when an accessor or another component of the data storage library passes therethrough. The barriers preferably operate to resist, impede, inhibit, and/or prevent environmental conditions, e.g., temperature and/or humidity, from within the interior of the library from intruding into the acclimation chamber, and vice versa.

At 4006, a library controller/processor counts and/or determines whether a certain period of time elapses since deployment of the environmental barrier. At 4008, if the predetermined amount of time has not passed, the acclimation process continues where the environmental conditions (e.g., temperature and/or humidity levels) within the acclimation chamber are gradually increased or decreased at 4010. The environmental conditions within the acclimation chamber may gradually increase or decrease over a period of time, and/or alternatively until they are at, near, and/or with a desired range or threshold of the corresponding environmental conditions (e.g., the temperature and/or humidity levels) outside of or within the data storage library, dependent upon the direction of acclimation desired. The environmental conditions (e.g., temperature and/or humidity levels) in the acclimation chamber may be increased and/or decreased via any of the environmental control devices described above, through utilization of the environmental conditioning unit if appropriate, or through exposure to the ambient air inside of and/or outside of the data storage library and relying on convective and/or conductive heating/cooling modes to change the temperature (e.g., osmosis) of the acclimation chamber. If the determined amount of time has passed, which may be predetermined and/or calculated in real time based upon environmental conditions inside and outside of the data storage library, the acclimation process is complete and the acclimation chamber may be accessed by either an operator or an accessor at 4012.

Figure 10:
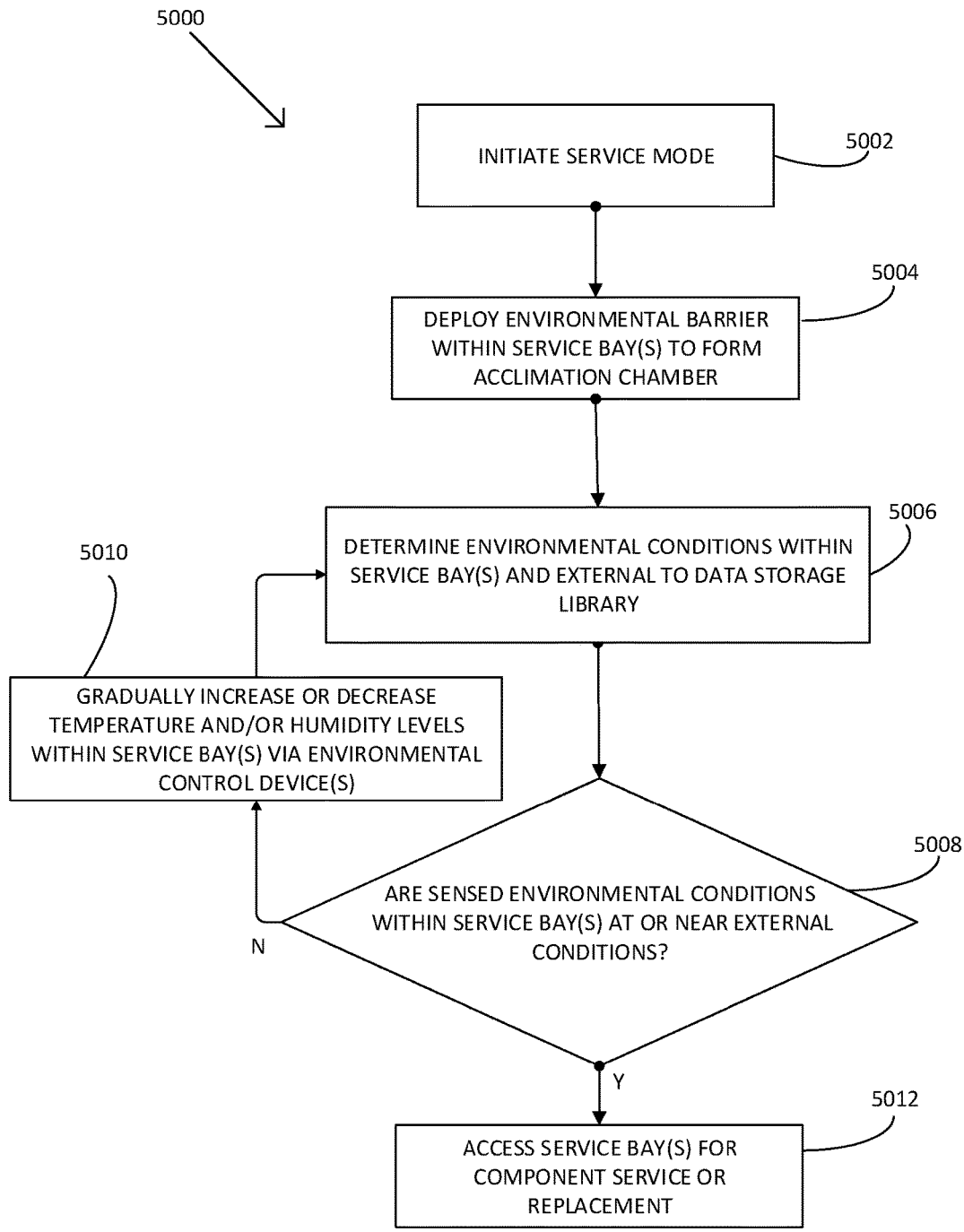
FIG. 10 is a flowchart of a method of acclimating one or more service bays in accordance with another embodiment.

Next, with reference to FIG. 10, a process 5000 in accordance with another embodiment for acclimating an acclimation chamber is disclosed. While the process may be considered for the sake of convenience and not with the intent of limiting the disclosure as comprising a series and/or number of steps, it will be appreciated that the process does not need to be performed as a series of steps and/or the steps do not need to be performed in the order shown and described, but may be performed as an integrated process, a series of steps, in the order described or in an alternative order. At 5002, a service mode is initiated, either manually or automatically, in accordance with any of the above-described methods. At 5004, one or more environmental barriers are deployed within at least one of the service bays and/or at least one of the active, operational library frames of the data storage library system so as to form an acclimation chamber and environmentally insulate, separate, and/or isolate at least a portion of the one or more service bays from the conditions within the other library frames. Deployed may refer to placing, moving, enabling, engaging, activating, closing, etc. an environmental barrier, as discussed previously. In addition, a permanent barrier (e.g., hanging slots or a split membrane) may be deployed by default and may become temporarily undeployed when an accessor or another component of the data storage library passes therethrough. The barriers preferably operate to resist, impede, inhibit, and/or prevent environmental conditions, e.g., temperature and/or humidity, from within the interior of the library from intruding into the acclimation chamber, and vice versa.

At 5006, one or more desired environmental conditions (e.g., temperature and/or humidity) both within the service bay(s) and outside of the data storage library are determined. Such a determination of environmental conditions may be made by one or more environmental condition sensors disposed within the acclimation chamber(s) of the at least one service bay and/or at least one active, operational library frame(s), and/or external to the data storage library. The sensor(s) may be in communication with the library processing unit and/or controller. At 5008, a determination is made as to whether or not the environmental conditions detected within the acclimation chamber of the at least one service bay(s) and/or active, operational library frames are at, near, and/or within a desired range or threshold of the internal environmental conditions of the library and/or external environmental conditions. If no, the process continues where the one or more environmental conditions (e.g., the temperature and/or humidity levels) within one or more of the acclimation chamber(s) of the service bays and/or active, operation library frames are gradually increased or decreased at 5010 so as to be at, near, and/or within a desired range or threshold of the corresponding environmental conditions (e.g., the temperature and/or humidity levels) inside and/or outside of the data storage library. The environmental conditions (e.g., the temperature and/or humidity levels) may be actively increased and/or decreased via any of the environmental control devices, and/or by utilizing the environmental conditioning unit associated with the library system as described above. However, if it is determined at 5008 that the environmental conditions within the acclimation chamber of the one or more service bay(s) and/or active, operational library frames are at, near, and/or within a desired range or threshold of the internal and/or external conditions, the acclimation process is complete and the acclimation chamber may be accessed by either an operator or an accessor at 5012.

It follows that various embodiments described and/or suggested herein are able to provide data storage systems, and optionally, automated data storage libraries having climate control capabilities associated with the automated data storage library, with at least one acclimation chamber. As a result, favorable conditions (e.g., temperature, humidity, absence of contaminants, etc.) may be maintained for the data storage drives, data storage cartridges, and/or data storage media which may be stored in the library frame, while condensation formation and/or accumulation on the media (and its subsequent effect on contacting devices) may be impeded, resisted, inhibited and preferably avoided. Impeding, resisting, inhibiting and/or substantially avoiding the formation and accumulation of condensation and moisture may be particularly beneficial for tape libraries, tape cartridges and tape media. Moreover, a data storage library may be maintained at an appropriate temperature, humidity, contaminant level, etc. regardless of whether the library is installed in unfavorable (e.g., hot and/or wet) conditions. Herein, a frame comprises an expansion component of a library that provides any or all of the following: data storage cartridge slots, data storage drives, I/O storage slots, robot accessors, redundant components, etc. In addition, frames may be added to the side of a library, on top of a library, behind a library, in front of a library, under a library, components or modules in a rack, etc. While the description of this disclosure has included frames, modules, rack units or other expansion components of a library, aspects of the disclosure, and the use of an acclimation chamber, are not limited to expandable data storage libraries. Any library, whether comprising expansion components or not, may be divided into portions wherein an environmental barrier is used to environmentally differentiate one library portion from another library portion.

In a number of the processes described above, a determination is made as to whether or not the one or more environmental conditions within the acclimation chamber is at, near, within a range of and/or within a threshold of the one or more environmental conditions of the interior and/or exterior of the data storage library. The amount by which the conditions inside the acclimation chamber are near, within a range of, and/or within a threshold of the conditions inside and/or outside the data storage library may be predetermined and set during programming, delivery or set and/or reset during use and may be based upon environmental conditions of the location and facility where the data storage library will be operated, and the internal environmental conditions the library will be exposed to during operation. The numbers and/or values (e.g., how near, the range and/or threshold difference) may be set in memory and/or placed in a look-up table based upon the anticipated conditions of use. Alternatively, the numbers and/or values for how near, the range, and/or threshold differences can be based upon calculations performed in real time based upon the conditions of use, and/or look-up tables may be programmed and which provide the numbers and values for how near, the range and/or threshold differences based upon real time measurements of the environmental conditions in the respective areas (acclimation chamber, interior and exterior of the data storage library) and the process being undertaken.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), an SD card (Secure Digital), micro-SD card, CompactFlash, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as controller 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A data storage library for the handling of a plurality of data storage cartridges comprising:
   at least a first library portion and at least a second library portion, wherein the second library portion is configured to store and receive media associated with one or more data storage cartridges and comprises an environmental conditioning unit configured to control at least one environmental condition within the second library portion to be different than at least one environmental condition external to the first library portion and external to the second library portion;
   at least one acclimation chamber formed within the first library portion, wherein the at least one acclimation chamber permits transition of at least one environmental condition within the at least one acclimation chamber toward one of the at least one environmental condition of the second library portion and the at least one environmental condition external to the first library portion and the second library portion; and
   at least one deployable environmental barrier, wherein the at least one deployable environmental barrier is configured to extend within an opening between the first library portion and the second library portion to insulate the at least one environmental condition within the at least one acclimation chamber from the at least one environmental condition within the second library portion.

2. The data storage library of claim 1, wherein, in a first mode, one or more environmental conditions within the at least one acclimation chamber are controlled to gradually transition toward the one or more environmental conditions within the second library portion, and further wherein, in a second mode, the one or more environmental conditions within the at least one acclimation chamber are controlled to gradually transition the one or more environmental conditions within the at least one acclimation chamber toward one or more environmental conditions external to the data storage library.

3. The data storage library of claim 1, wherein the at least one deployable environmental barrier is at least one of the group consisting of one of a door, a hanging panel, a sliding panel, a hinged panel, hanging slots, hanging flaps, a split membrane, baffles, ducts, air valves, an air curtain, and combinations therefor.

4. The data storage library of claim 1, wherein the at least one deployable environmental barrier is deployed by at least one of the group consisting of manually by an operator and automatically by a component associated with at least one of the first library portion and the second library portion.

5. The data storage library of claim 4, wherein the at least one deployable environmental barrier is deployed by at least one of a robotic accessor, a library controller via a mechanical control device, and combinations thereof.

6. The data storage library of claim 1, wherein the at least one acclimation chamber comprises at least one environmental control device, wherein the at least one environmental control device consists of at least one of a thermoelectric heater, thermoelectric cooler, an electric heater, a liquid heater, a liquid cooler, an air conditioner, a heat pump, an evaporative cooler, an ionizer, a de-ionizer, a humidifier, a dehumidifier, at least one fan, and any combination thereof.

7. The data storage library of claim 1, wherein the first library portion and the second library portion is at least one of a service bay configured for service of components within the data storage library and an active, operational data storage library frame.

8. The data storage library of claim 7, wherein the at least one service bay forms the at least one acclimation chamber.

9. The data storage library of claim 1, further comprising at least one of the group consisting of at least one environmental sensor configured to sense at least one environmental condition within the second library portion, at least one environmental sensor configured to sense at least one environmental condition within the at least one acclimation chamber, and at least one environmental sensor configured to sense at least one environmental condition external to the data storage library.

* * * * *